United States Patent [19]
Goodrich

[11] Patent Number: 5,331,028
[45] Date of Patent: Jul. 19, 1994

[54] POLYMER-MODIFIED ASPHALT COMPOSITION AND PROCESS FOR THE PREPARATION THEREOF

[75] Inventor: Joseph L. Goodrich, Lafayette, Calif.

[73] Assignee: Chevron Research and Technology Company, a division of Chevron U.S.A. Inc., San Francisco, Calif.

[21] Appl. No.: 84,934

[22] Filed: Jun. 30, 1993

[51] Int. Cl.$^5$ .............................................. C08L 95/00
[52] U.S. Cl. ....................................... 524/68; 524/59; 524/69
[58] Field of Search ............................ 524/59, 68, 69

[56]  References Cited

U.S. PATENT DOCUMENTS

| | | | |
|---|---|---|---|
| 3,440,195 | 4/1969 | Norcross | 524/68 |
| 3,978,014 | 8/1976 | van Beem et al. | 524/68 |
| 4,145,322 | 3/1979 | Maldonado et al. | 524/68 |
| 4,172,061 | 10/1979 | Bresson | 524/68 |
| 4,217,259 | 8/1980 | Bresson | 524/68 |
| 4,282,127 | 8/1981 | Desgouilles | 524/68 |
| 4,585,816 | 4/1986 | Vitkuske et al. | 524/68 |

FOREIGN PATENT DOCUMENTS

WO91/09/07-605 7/1991 European Pat. Off.

OTHER PUBLICATIONS

Kraus, *Modification of Asphalt by Block Polymers of Butadiene and Styrene*, Rubber Chemistry and Technology, vol. 55, No. 5, Nov.-Dec. (1982) pp. 1389-1402.
Goodrich, Asphalt and Polymer Modified Asphalt Properties Related to the Performance of Asphalt Concrete Mixes, pp. 116-161.

*Primary Examiner*—Paul R. Michl
*Assistant Examiner*—Peter Szekely
*Attorney, Agent, or Firm*—J. A. Hagenah; J. A. Scholten; W. K. Turner

[57] ABSTRACT

A polymer-modified asphalt composition containing (a) about 80 to 99.7 weight percent of a polymer-asphalt reaction product prepared by reacting (i) about 100 parts by weight of an asphalt having an initial viscosity at 60° C. of from 100 to 20,000 poise, with (ii) about 0.5 to 11 parts by weight a glycidyl-containing ethylene copolymer containing about 0.1 to about 20 weight percent glycidyl moieties and having a weight-average molecular weight of from about 10,000 to about 1,000,000; and (b) about 0.3 to 20 weight percent of a styrene/conjugated-diene block copolymer having a weight-average molecular weight of from about 100,000 to about 1,000,000.

53 Claims, No Drawings

POLYMER-MODIFIED ASPHALT COMPOSITION AND PROCESS FOR THE PREPARATION THEREOF

BACKGROUND OF THE INVENTION

1. Field of the Invention

This invention relates to polymer-modified asphalt compositions. More particularly, this inventions relates to polymer-modified asphalt compositions prepared from asphalt, a glycidyl-containing ethylene copolymer and a block copolymer derived from styrene and a conjugated-diene.

2. Description of the Related Art

It is well known that polymers can be used to modify the rheological properties of asphalt. A wide variety of polymers have been used for this purpose and numerous polymer-modified asphalt compositions are known in the art.

For example, polymer-modified asphalt compositions prepared using styrene/conjugated-diene block copolymers are described in "Modification of Asphalt by Block Polymers of Butadiene and Styrene" by G. Kraus, Rubber Chemistry and Technology, Vol. 55, No. 5, November-December 1982. Polymer-modified asphalts are also discussed in "Asphalt and Polymer Modified Asphalt Properties Related to the Performance of Asphalt Concrete Mixes" by J. L. Goodrich, Proc. of the Association of Asphalt Paving Technologists, Vol. 52, pp. 116–160 (1988).

Additionally, U.S. Pat. No. 4,217,259, issued Aug. 12, 1980 to C. R. Bresson, discloses an asphaltic concrete composition comprising an asphalt, a mineral aggregate, and a radial teleblock diene/monovinyl aromatic copolymer having a weight ratio of diene to monovinyl aromatic monomer of at least about 75/25 to about 90/10 and a weight average molecular weight of from about 150,000 to about 300,000. The asphaltic concrete compositions disclosed in this patent are taught to exhibit excellent flexural fatigue test characteristics.

Similarly, U.S. Pat. No. 4,172,061, issued Oct. 23, 1979 to C. R. Bresson, discloses an asphaltic concrete composition comprising an asphalt, a mineral aggregate, and composition using a sufficient amount p a hydrogenated radial teleblock diene/monovinyl aromatic copolymer having a weight ratio of diene to monovinyl aromatic monomer of about 70/30 and a weight average molecular weight of from about 70,000 to about 150,000.

U.S. Pat. No. 4,585,816, issued Apr. 29, 1986 to J. F. Vitkuske et al., discloses a method of preparing a mixture of asphalt and a block copolymer of $AB(BA)_n$ configuration, wherein n is an integer from 1 to 10, block A is a vinyl aromatic and block B is a diene.

U.S. Pat. No. 4,145,322, issued Mar. 30, 1979 to P. Maldonado et al., discloses a process for preparing a bitumen-polymer composition comprising 80 to 98% by weight of a bitumen having a penetration value between 30 and 220, 2 to 20% by weight of a block copolymer of styrene and a conjugated-diene having a molecular weight between 30,000 and 300,000, and 0.1 to 3% by weight of sulfur. The bitumen-polymer compositions of this patent are taught to have excellent mechanical properties even at low temperatures.

U.S. Pat. No. 3,440,195, issued Apr. 22, 1969 to G. W. Norcross, discloses a thermoplastic sealing composition comprising a product obtained by heating at a temperature between about 200° F. (93° C.) and about 400° F. (204° C.) for at least 6 hours a mixture of (1) from 3.0 to 5.5 parts by weight of an asphalt and (2) a block copolymer comprising from 12 to 20 percent by weight of a polystyrene homopolymer block and the remainder a block of a copolymer of styrene and butadiene, the total weight of styrene in the block copolymer being less than 30 percent.

Styrene/conjugated-diene block copolymers have also been used in combination with other types of polymers to prepare polymer-modified asphalt compositions. For example, U.S. Pat. No. 3,978,014, issued Aug. 31, 1976 to E. J. van Beem et al., discloses a bituminous composition comprising 75 to 92 weight percent of a bituminous component, 4 to 15 weight percent of a block copolymer of monoalkenyl aromatics and conjugated alkadienes, and 4 to 15 weight percent of a thermoplastic polymer having a molecular weight higher than 10,000, a solubility parameter between 7.8 and 8.8 and a crystallinity of less than 60 percent at 25° C. The bituminous compositions disclosed in this patent are taught to have improved properties with regard to storage stability, penetration, softening point, breaking point and adhesion.

Similarly, U.S. Pat. No. 4,282,127, issued Aug. 4, 1981 to H. F. M. Desgouilles, discloses a bitumen-based composition containing a ternary mixture of 52 to 78 weight percent bitumen, 20 to 40 weight percent polyolefin, and 2 to 8 weight percent of a butadiene-styrene copolymer. The bitumen-based compositions disclosed in this patent are taught to be useful for sealing purposes.

More recently, epoxide-containing ethylene copolymers, such as glycidyl-containing ethylene copolymers, have been used to prepared polymer-modified asphalts. For example, PCT International Application WO 91/09907, published Jul. 11, 1991, discloses a thermoplastic polymer-linked-asphalt composition prepared by reacting asphalt with an epoxide-containing reactant polymer, preferably a glycidyl-containing ethylene copolymer. The polymer-linked-asphalt product disclosed in this application is taught to be particularly useful in road paving and roofing applications. This patent application additionally teaches on page 18, lines 11–30 that certain non-reactive diluent polymers may be added to the asphalt compositions disclosed therein.

Although various polymer-modified asphalt compositions are known in the art, there still exists a need in the asphalt industry for improved polymer-modified asphalt compositions. In part, this is due to the fact that new asphalt performance criteria or specifications are continually being developed by various state and federal agencies in an effort to increase the effective life of paved roads and other asphalt products under diverse climatic conditions. Not all existing polymer-modified asphalt compositions are able to meet these new, more stringent specifications. Accordingly, a need exists for improved polymer-modified asphalt compositions and methods for preparing such compositions.

It has now been discovered that polymer-modified asphalt compositions having excellent performance properties can be prepared using the novel combination of a glycidyl-containing ethylene copolymer and a styrene/conjugated-diene block copolymer. Moreover, this unique combination of copolymers has been found to be especially useful for adjusting the rheological properties of an asphalt to meet certain asphalt specification requirements.

SUMMARY OF THE INVENTION

The present invention provides a polymer-modified asphalt composition comprising:

(a) about 80 to 99.7 weight percent of a polymer-asphalt reaction product prepared by reacting (i) about 100 parts by weight of an asphalt having an initial viscosity at 60° C. of from 100 to 20,000 poise, with (ii) about 0.5 to 11 parts by weight of a glycidyl-containing ethylene copolymer containing about 0.1 to about 20 weight percent glycidyl moieties and having a weight-average molecular weight of from about 10,000 to about 1,000,000; and (b) about 0.3 to 20 weight percent of a styrene/conjugated-diene block copolymer having a weight-average molecular weight of from about 100,000 to about 1,000,000.

The present invention further provides an aggregate composition comprising aggregate and from about 3 to about 15 weight percent of a polymer-modified asphalt of the present invention.

The present invention additionally provides methods for preparing polymer-modified asphalt compositions. In one of its method embodiments, the present invention is directed to a process comprising the steps of:

(a) forming a reaction mixture comprising (i) about 70 to 99.2 weight percent of an asphalt having an initial viscosity at 60° C. of from about 100 to about 20,000 poise, (ii) about 0.5 to 10 weight percent of a glycidyl-containing ethylene copolymer containing about 0.1 to about 20 weight percent glycidyl moieties and having a weight-average molecular weight of from about 10,000 to about 1,000,000, and (iii) about 0.3 to 20 weight percent of a styrene/conjugated-diene block copolymer having a weight-average molecular weight of from about 100,000 to about 1,000,000; and (b) mixing said reaction mixture for a time and at a temperature sufficient to cause substantially complete reaction of said asphalt with the glycidyl moieties of said glycidyl-containing ethylene copolymer.

In another of its method embodiments, the present invention is directed to a process comprising the steps of:

(a) forming a reaction mixture comprising (i) about 90 to 99.5 weight percent of an asphalt having an initial viscosity at 60° C. of from about 100 to about 20,000 poise, and (ii) about 0.5 to 10 weight percent of a glycidyl-containing ethylene copolymer containing about 0.1 to about 20 weight percent glycidyl moieties and having a weight-average molecular weight of from about 10,000 to about 1,000,000;

(b) mixing said reaction mixture for a time and at a temperature sufficient to cause substantially complete reaction of said asphalt with the glycidyl moieties of said glycidyl-containing ethylene copolymer; and (c) blending about 0.3 to 25 parts by weight of a styrene/conjugated-diene block copolymer having a weight-average molecular weight of from about 100,000 to about 1,000,000 with about 100 parts by weight of the product from step (b) above.

DETAILED DESCRIPTION OF THE INVENTION

As indicated above, the polymer-modified asphalt compositions of the present invention are prepared from an asphalt, a glycidyl-containing ethylene copolymer and a styrene/conjugated-diene block copolymer.

The Asphalt

The asphalt employed in this invention can be either a naturally-occurring asphalt or a manufactured asphalt produced by refining petroleum. Naturally-occurring asphalts suitable for use in this invention include, for example, lake asphalts, rock asphalts and the like. Suitable manufactured asphalts include, for example, straight-run asphalts, propane asphalts, air-blown asphalts, thermal asphalts, blended asphalts and the like.

As used herein, the term "asphalt" includes materials sometimes referred to as "bitumen" and no distinction between these terms is intended.

Asphalts suitable for use in this invention have an initial viscosity at 60° C. of from about 100 to about 20,000 poise. The term "initial viscosity" as used herein refers to the viscosity of the asphalt before modification with the copolymers. The viscosity at 60° C. of the asphalt may be determined using the procedures described in ASTM Test Method D 2171.

Preferred asphalts have an initial viscosity at 60° C. of from 100 to 10,000 poise and more preferred asphalts have an initial viscosity at 60° C. of from 150 to 4,000 poise. Asphalts having an initial viscosity at 60° C. of from 175 to 1,500 poise are especially preferred.

The Glycidyl-Containing Ethylene Copolymer

The glycidyl-containing ethylene copolymers employed in this invention are well known in the art and can be readily prepared by the procedures described, for example, in U.S. Pat. No. 4,070,532, issued Jan. 24, 1978 to C. F. Hammer; U.S. Pat. No. 4,157,428, issued Jun. 5, 1979 to C. F. Hammer; and PCT International Application WO 85/03718, published Aug. 29, 1985, the entire disclosures of which are incorporated herein by reference.

The term "glycidyl moiety" as used herein refers to an epoxide-containing functional group having the formula:

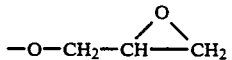

Generally, glycidyl-containing ethylene copolymers suitable for use in this invention will contain at least about 0.02 weight percent glycidyl moieties, preferably, at least 0.08 weight percent glycidyl moieties based on the total weight percent of the ethylene copolymer.

More preferably, the glycidyl-containing ethylene copolymer will contain about 0.1 to about 20 weight percent glycidyl moieties; still more preferably, 0.2 to 10 weight percent glycidyl moieties based on the total weight of the ethylene copolymer.

Preferred glycidyl-containing ethylene copolymers are random copolymers having the generalized formula:

In this generalized formula, E represents a copolymer unit having the formula:

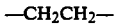

Copolymer unit E is typically derived from ethylene and generally comprises about 35 to 99.5 weight percent, preferably 50 to 99 weight percent, more preferably 60 to 98 weight percent of the glycidyl-containing ethylene copolymer.

X in the generalized formula above represents a copolymer unit having the formula:

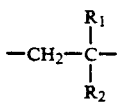

wherein $R_1$ is hydrogen, methyl or ethyl, and $R_2$ is —C(O)OR$_3$, —OC(O)R$_3$ or —OR$_3$, wherein $R_3$ is an alkyl group having 1 to about 10 carbon atoms. Preferably, $R_1$ is hydrogen or methyl. More preferably, $R_1$ is hydrogen. $R_2$ is preferably —C(O)OR$_3$; wherein $R_3$ is as defined above. Preferably, $R_3$ is an alkyl group having 1 to 4 carbon atoms.

Copolymer unit X is typically derived from an alkyl acrylate, such as methyl acrylate, ethyl acrylate, n-propyl acrylate, isopropyl acrylate, n-butyl acrylate, isobutyl acrylate and the like; an alkyl methacrylate, such as methyl methacrylate, ethyl methacrylate, n-propyl methacrylate, isopropyl methacrylate, n-butyl methacrylate, isobutyl methacrylate and the like; an alkyl ethacrylate, such as methyl ethacrylate, ethyl ethacrylate, n-butyl ethacrylate and the like; an alkyl vinyl ether, such as methyl vinyl ether, ethyl vinyl ether, n-propyl vinyl ether, isopropyl vinyl ether, n-butyl vinyl ether, isobutyl vinyl ether, secbutyl vinyl ether and the like; or an alkyl vinyl ester, such as vinyl acetate and the like.

Preferably, X is derived from n-butyl acrylate, ethyl acrylate, isobutyl acrylate, methyl acrylate or vinyl acetate. More preferably, X is derived from n-butyl acrylate.

Generally, X will comprise 0 to about 50 weight percent, preferably 10 to 40 weight percent, more preferably 20 to 35 weight percent of the glycidyl-containing ethylene copolymer.

Y in the generalized formula above represents a copolymer unit having the formula:

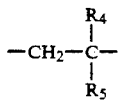

wherein $R_4$ is hydrogen or methyl, preferably methyl; and $R_5$ is an epoxide-containing moiety having the formula:

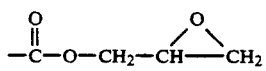

or

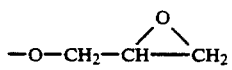

$R_5$ is preferably an epoxide-containing moiety having the formula:

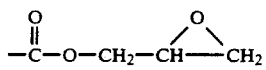

Copolymer unit Y is typically derived from glycidyl acrylate, glycidyl methacrylate, or glycidyl vinyl ether. Preferably, Y is derived from glycidyl methacrylate.

Generally, Y will comprise about 0.50 to about 15 weight percent, preferably 0.75 to 10 weight percent, more preferably 1 to 7 weight percent of the glycidyl-containing ethylene copolymer.

Additional copolymer units, such as those derived from carbon monoxide, sulfur dioxide or acrylonitrile, may also be present in the ethylene copolymer in a minor amount. These copolymer units may comprise 0 to about 15 weight percent of the ethylene copolymer, but ethylene copolymers containing such copolymer units are not preferred.

A preferred group of glycidyl-containing ethylene copolymers for use in this invention are those copolymers containing 10 to 40 weight percent X copolymer units, and 0.75 to 10 weight percent Y copolymer units, the remainder being E copolymer units.

Another preferred group of glycidyl-containing ethylene copolymers are those having the generalized formula: E/Y wherein E and Y are as defined above and Y comprises 0.75 to 10 weight percent of the glycidyl-containing ethylene copolymer, the remainder being E copolymer units.

Generally, the glycidyl-containing ethylene copolymers employed in this invention will have a weight-average molecular weight of from about 10,000 to about 1,000,000. Preferably, the glycidyl-containing ethylene copolymer has a weight-average molecular weight of from 25,000 to 650,000, more preferably from 40,000 to 400,000. The weight-average molecular weight of the ethylene copolymer can be determined using procedures well known to those skilled in the art, such as gel permeation chromatography (GPC). For example, the weight-average molecular weight of the copolymers used in the present application can be determined using conventional gel permeation chromatography that employs a tetrahydrofuran mobile phase, polystyrene molecular weight standards, and a refractive index detector.

The melt flow index of the glycidyl-containing ethylene copolymer will typically be in the range from about 0.1 to about 2000, preferably 0.5 to 500, more preferably 1 to 100, as determined by ASTM Test Method D 1238, Method E.

The Styrene/Conjugated-Diene Block Copolymer

The styrene/conjugated-diene block copolymers employed in the present invention are well known polymers derived from styrene and a conjugated-diene, such as butadiene, isoprene, 1,3-pentadiene and the like. Suitable styrene/conjugated-diene block copolymers are commercially available, for example, under the tradenames KRATON®, EUROPRENE SOL® and SOLPRENE® from Shell Chemical Company, Enichem and Phillips Petroleum Company, respectively. Alternatively, these block copolymers may be prepared by conventional procedures, such as those described in U.S. Pat. No. 3,281,383, issued Oct. 25, 1966 to R. P. Zelinski et al., and U.S. Pat. No. 3,639,521, issued Feb. 1, 1972 to H. L. Hsieh, the entire disclosures of which are incorporated herein by reference.

The styrene/conjugated-diene block copolymers employed in this invention may be di-, tri- or poly-block copolymers having a linear or radial (star or branched) structure. Suitable block copolymers include, for example, diblock A-B type copolymers; linear (triblock)

A-B-A type copolymers; and radial (A-B)$_n$ type copolymers; wherein A refers to a copolymer unit derived from styrene and B refers to a copolymer unit derived from a conjugated-diene. Preferred block copolymers have a linear (triblock) A-B-A type structure or a radial (A-B)$_n$ type structure.

Generally, the styrene/conjugated-diene block copolymer will contain about 10 to about 50 weight percent copolymer units derived from styrene and about 50 to about 90 weight percent copolymer units derived from a conjugated-diene, preferably butadiene or isoprene, more preferably butadiene. More preferably, 20 to 40 weight percent of the copolymer units will be derived from styrene, the remainder being derived from the conjugated-diene.

Preferably, the styrene/conjugated-diene block copolymer employed in this invention will have a weight-average molecular weight of from about 100,000 to about 1,000,000, more preferably from 150,000 to 750,000, and still more preferably from 200,000 to 500,000. The weight-average molecular weight of the styrene/conjugated-diene block copolymer can be determined using conventional gel permeation chromatography.

The melt flow index of the styrene/conjugated-diene block copolymer will typically be in the range from about 0 to about 200, preferably 0 to 100, more preferably 0 to 10, as determined by ASTM Test Method D 1238, Condition G.

The Polymer-Modified Asphalt Composition

The polymer-modified asphalt compositions of the present invention contain (a) a polymer-asphalt reaction product prepared by reacting an asphalt with a glycidyl-containing ethylene copolymer, and (b) a styrene/conjugated-diene block copolymer.

Generally, the polymer-asphalt reaction product employed in the present invention is formed by mixing about 100 parts by weight of an asphalt with about 0.5 to 11 parts by weight of a glycidyl-containing ethylene copolymer for a time and at a temperature sufficient to cause a reaction to occur between the asphalt and the glycidyl moieties of the ethylene copolymer. Preferably, the polymer-asphalt reaction product is prepared using 100 parts by weight asphalt and about 0.75 to 5.25 parts by weight, more preferably 1 to 3.1 parts by weight, of a glycidyl-containing ethylene copolymer per 100 parts by weight of asphalt.

The polymer-asphalt reaction product may be formed in the presence of the styrene/conjugated-diene block copolymer, thereby directly producing a polymer-modified asphalt composition of the present invention. Alternatively, the polymer-asphalt reaction product may be prepared separately from the styrene/conjugated-diene block copolymer and subsequently blended with the styrene/conjugated-diene copolymer to produce a polymer-modified asphalt composition of this invention.

The exact chemical structure of the polymer-asphalt reaction product is not presently known. However, it is not necessary for one skilled in the art to understand the chemical structure of this material precisely in order to prepare and utilize the polymer-modified asphalt compositions of the present invention.

Without wishing to be bound by theory, however, it is generally believed that under suitable reaction conditions the asphalt reacts with the glycidyl moieties present in the ethylene copolymer to form one or more covalent bonds between the asphalt and the ethylene copolymer. The functional groups present in the asphalt which react with the glycidyl moieties are not presently known, but may include carboxylic acids, phenols, amines, thiols and the like. These functional groups are believed to react with the glycidyl moieties of the ethylene copolymer by opening the epoxide ring to form a hydroxy(oxypropylene) moiety. By the term "hydroxy(oxypropylene) moiety," it is meant a divalent radical having the formula:

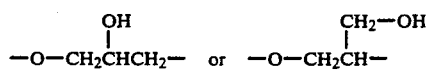

wherein the ether oxygen radical is covalently bound to the ethylene copolymer and the carbon atom radical is covalently bound to the asphalt. Thus, the asphalt and the ethylene copolymer are believed to be cross-linked by one or more hydroxy(oxypropylene) moieties in the polymer-asphalt reaction product.

In one embodiment of the present invention, the polymer-modified asphalt compositions of this invention are prepared by forming a reaction mixture containing (i) an asphalt having an initial viscosity at 60° C. of from 100 to 20,000 poise, (ii) a glycidyl-containing ethylene copolymer containing about 0.1 to about 20 weight percent glycidyl moieties and having a weight-average molecular weight of from about 10,000 to about 1,000,000, and (iii) a styrene/conjugated-diene block copolymer having a weight-average molecular weight of from about 100,000 to about 1,000,000; and then mixing this reaction mixture for a time and at a temperature sufficient to cause substantially complete reaction of the asphalt with the glycidyl moieties of the glycidyl-containing ethylene copolymer.

Generally, the glycidyl-containing ethylene copolymer and the styrene/conjugated-diene copolymer are combined with the asphalt to form the reaction mixture at a temperature of from about 100° C. to about 250° C. The copolymers may be combined with the asphalt in any order or both copolymers may be added to the asphalt simultaneously. To facilitate handling, either or both of the copolymers may be diluted with a minimum amount of a hydrocarbon oil or solvent before addition to the asphalt.

Typically, the glycidyl-containing ethylene copolymer is added in an amount sufficient to comprise about 0.5 to about 10 weight percent of the reaction mixture, preferably 0.75 to 5 weight percent, more preferably 1 to 3 weight percent.

The styrene/conjugated-diene copolymer is generally added in an amount sufficient to comprise about 0.3 to about 20 weight percent of the reaction mixture, preferably 0.4 to 10 weight percent, more preferably 0.5 to 5 weight percent.

The specific amount of each copolymer employed in the polymer-modified asphalt compositions of this invention will depend essentially on the initial viscosity of the asphalt and on the desired properties of the polymer-modified asphalt.

After combining the copolymers with the asphalt, the resulting reaction mixture is mixed for a time and at a temperature sufficient to cause substantially complete reaction of the asphalt with the glycidyl moieties of the ethylene copolymer. Typically, substantially complete reaction will occur when mixing is conducted at a temperature of at least about 100° C., preferably about 100°

C. to about 250° C. for at least about 2 hours preferably for about 4 to 48 hours. More preferably, mixing is conducted at 170° C. to 220° C. for about 6 to 36 hours, still more preferably at 190° C. to 200° C. for 8 to 24 hours.

In general, reaction of the asphalt with the glycidyl moieties of the ethylene copolymer is evidenced by an increase in the viscosity of the reaction mixture. The reaction is considered to be substantially complete when the viscosity of the reaction mixture does not increase by more than 25 percent in 12 hours, preferably by not more than 10 percent in 12 hours.

In another embodiment of the present invention, the polymer-modified asphalt compositions of this invention are prepared by first forming a reaction mixture containing (i) an asphalt having an initial viscosity at 60° C. of from 100 to 20,000 poise, and (ii) a glycidyl-containing ethylene copolymer containing about 0.1 to about 20 weight percent glycidyl moieties and having a weight-average molecular weight of from about 10,000 to about 1,000,000; and mixing this reaction mixture for a time and at a temperature sufficient to cause substantially complete reaction of said asphalt with the glycidyl moieties of the glycidyl-containing ethylene copolymer. The mixing conditions for this embodiment of the present invention are essentially the same as those described above.

When the reaction between the asphalt and the glycidyl-containing ethylene copolymer is essentially complete, the styrene/conjugated-diene block copolymer is then blended with the polymer-asphalt reaction product to form the desired polymer-modified asphalt composition. Typically, this blending step will be conducted at a temperature of about 170° C. to about 220° C. preferably 180° C. to 210° C., more preferably 190° C. to 200° C. for a time sufficient to produce a substantially homogeneous mixture, generally about 8 to 24 hours.

In the first step of this procedure, the glycidyl-containing ethylene copolymer is typically added to the asphalt in an amount sufficient to comprise about 0.5 to about 10 weight percent of the reaction mixture, preferably 0.75 to 5 weight percent, more preferably 1 to 3 weight percent.

The styrene/conjugated-diene block copolymer is typically blended with the polymer-asphalt reaction product in an amount ranging from about 0.3 to 25 parts by weight per 100 parts by weight of the polymer-asphalt reaction product. Preferably, about 0.4 to 11 parts by weight, more preferably 0.5 to 5.25 parts by weight, of the styrene/conjugated-diene block copolymer is blended with about 100 parts by weight of the polymer-asphalt reaction product.

The polymer-modified asphalt compositions provided by the present invention are useful in a wide variety of asphalt applications including road paving and roofing applications. The compositions can be used in these applications in either neat or in emulsified form. Asphalt emulsions are well known to those skilled in the art. For example, such emulsions typically comprise water, an asphalt composition and surfactants. Emulsions can be prepared using the polymer-modified asphalt compositions of the present invention by employing any of the conventional emulsification procedures known to those skilled in the asphalt art.

An especially preferred use for the polymer-modified asphalt compositions of the present invention is in road paving applications in which the polymer-modified asphalt composition is mixed with aggregate to form asphalt concrete. Typically, such aggregate compositions comprise from about 3 to about 15 weight percent, preferably 4 to 10 weight percent, of the polymer-modified asphalt composition with the balance of the composition being aggregate. These aggregate compositions are typically prepared by blending the polymer-modified asphalt composition with mineral aggregate, such as granite, basalt, limestone and the like, at a temperature in the range from 100° C. to 180° C.

When employed in road paving applications, the polymer-modified asphalt compositions of the present invention will generally have an unaged kinematic viscosity at 135° C. of from about 300 to 5,000 centistokes (cSt), preferably 500 to 4,000 cSt, more preferably 1,000 to 2,500 cSt. The kinematic viscosity of a polymer-modified asphalt composition can be determined using ASTM Test Method D 2170.

Additionally, the polymer-modified asphalt compositions of this invention used in road paving applications will generally have a viscosity at 60° C. after aging in the Rolling Thin-Film Oven Test (RTFOT) of from about 500 to 100,000 poise, preferably 800 to 50,000 poise, more preferably 1,000 to 10,000 poise as determined by ASTM Test Method D 2171. The Rolling Thin-Film Oven Test is a procedure for determining the hardening effect of heat and air on a moving film of asphalt. This procedure is described in further detail in ASTM Test Method D 2872.

An important factor in determining the suitability of an asphalt for road paving is the asphalt's viscosity ratio. The term "viscosity ratio" as used herein refers to the ratio of the viscosity of an asphalt after RTFOT aging to the viscosity of the asphalt before aging. Typically, an asphalt's viscosity ratio is determined by first measuring the viscosity at 60° C. of an unaged sample of the asphalt using ASTM Test Method D 2171. Another sample of the asphalt is then aged using ASTM Test Method D 2872 and the viscosity at 60° C. of this sample is determined. The ratio of the aged viscosity to the unaged viscosity is the viscosity ratio. Generally, asphalts used in road paving are required to have a viscosity ratio of less than 4. In practice, it is generally preferred to have a viscosity ratio of less than 3.5, more preferably less than 3.0.

Surprisingly, the unique combination of copolymers used in the polymer-modified asphalt compositions of the present invention are especially useful for preparing asphalt compositions having the aforementioned viscosities at 60° C. and 135° C. and further having a viscosity ratio of less than 3.0 preferably less than 2.8.

When prepared for use in road paving applications, the polymer-modified asphalt compositions of the present invention also typically have a ductility at 25° C. of at least 30 centimeters after RTFOT aging, preferably at least 60 centimeters after RTFOT aging. The ductility of an asphalt composition can be determined using ASTM Test Method D 113.

Further advantages of the present invention will be readily apparent to those of skilled in the asphalt art by consideration of the following examples.

EXAMPLES

The following examples are presented to illustrate specific embodiments of the present invention and should not be interpreted as limitations upon the scope of this invention.

These examples demonstrate the use of the novel copolymer combination of the present invention to adjust the rheological properties of an asphalt to meet a road paving specification. Specifically, various polymer-modified asphalt compositions were prepared in an effort to meet the PBA 6 road paving asphalt specification developed by the Pacific Coast Conference on Asphalt Specifications. In part, this specification requires that an asphalt have the following properties:

Unaged Asphalt:
Viscosity at 60° C. = at least 2,000 poise;
Kinematic viscosity at 135° C. = less than 2,000 centistokes;
Aged Asphalt (RTFOT):
Viscosity at 60° C. = at least 5,000 poise;
Ductility at 25° C. = at least 60 cm;
Penetration at 4° C. = at least 30 dmm; and
Viscosity ratio = less than 4.

A series of polymer-modified asphalt compositions were prepared by adding various amounts of a glycidyl-containing ethylene copolymer and/or a styrene/conjugated-diene block copolymer to 600 grams of an asphalt having an initial viscosity at 60° C. of 390 poise. Prior to adding the copolymers, the asphalt was heated to about 177° C. (350° F.). After adding the copolymers, the resulting mixture was blended under nitrogen for about two hours at about 191° C. to 196° C. (375° F. to 385° F.) and then stored in an oven at a temperature in the range from about 174° C. to 196° C. (345° F. to 385° F.) for the remainder of the study (up to 11 days).

The specific copolymers used to prepare the polymer-modified asphalt compositions were as follows:

(A) Polymer A was a random glycidyl-containing ethylene copolymer containing 60.2 weight percent copolymer units derived from ethylene, 34.5 weight percent copolymer units derived from n-butyl acrylate, and 5.3 weight percent copolymer units derived from glycidyl methacrylate.

(B) Polymer B was a branched styrene/conjugated-diene block copolymer containing 30 weight percent copolymer units derived from styrene and 70 weight percent copolymer units derived from butadiene. Polymer B is commercially available from Shell Chemical Company under the tradename KRATON D-1184G.

(C) Polymer C was a branched styrene/conjugated-diene block copolymer containing 30 weight percent copolymer units derived from styrene and 70 weight percent copolymer units derived from butadiene. Polymer C is commercially available from Enichem under the tradename EUROPRENE SOL T 161B.

Table I shows the weight percent of each copolymer used to prepare the polymer-modified asphalt compositions.

TABLE I

Polymer-Modified Asphalt Compositions
Weight Percent Polymer

| Example No. | Polymer A[1] | Polymer B[2] | Polymer C[2] | Total Polymer |
|---|---|---|---|---|
| 1 | 1.50 | 0.80 | — | 2.30 |
| 2 | 1.50 | 1.00 | — | 2.50 |
| 3 | 1.75 | 1.25 | — | 3.00 |
| 4 | 2.00 | 1.00 | — | 3.00 |
| 5 | 2.00 | 1.00 | — | 3.00 |
| 6 | 2.25 | 1.00 | — | 3.25 |
| A | — | — | 3.00 | 3.00 |
| B | — | — | 3.25 | 3.25 |
| C | — | 3.50 | — | 3.50 |
| D | — | 3.75 | — | 3.75 |
| E | 2.35 | — | — | 2.35 |

[1]Polymer A is a glycidyl-containing ethylene copolymer.
[2]Polymer B and Polymer C are styrene/conjugated-diene block copolymers.

Examples 1-6 in Table I were prepared using a combination of a glycidyl-containing ethylene copolymer (Polymer A) and a styrene/conjugated-diene block copolymer (Polymer B or Polymer C). Comparative Examples A-D were prepared using only a styrene/conjugated-diene block copolymer (Polymer B or Polymer C) and Comparative Example E was prepared using only a glycidyl-containing ethylene copolymer (Polymer A).

Each polymer-modified asphalt composition (Examples 1-6 and Comparative Examples A-E) was analyzed to determine the following rheological properties:
(1) Viscosity at 60° C. using ASTM Test Method D 2171;
(2) Kinematic Viscosity at 135° C. using ASTM Test Method D 2170;
(3) Viscosity at 60° after RTFOT using ASTM Test Method D 2171;
(4) Penetration at 4° C. after RTFOT aging using ASTM Test Method D 5 (200 grams, 60 seconds); and
(5) Ductility at 25° C. after RTFOT aging using ASTM Test Method D 113.

The Rolling Thin-Film Oven Test (RTFOT) aging was performed according to the procedure described in ASTM Test Method D 2872.

All of the polymer-modified asphalt compositions had a penetration at 4° C. after RTFOT aging of least 30 dmm and a ductility at 25° C. after RTFOT aging of least 60 cm, except Example 5 which, after storage for 5 days, had a ductility at 25° C. of 58 cm which is slightly below the specification requirement of 60 cm.

The viscosity data for Examples 1-6 and Comparative Examples A-E are set forth in Table II and Table III, respectively.

TABLE II

Viscosity Data for Examples 1-6

| Example No. | Storage Time (Days) | Vis. at 60° C. (Poise) | Vis. at 135° C. (cSt) | Vis. at 60° C. (Poise) | Vis. Ratio[2] | P/F[3] |
|---|---|---|---|---|---|---|
| 1 | 0.75 | 1850 | NA | 4800 | 2.59 | F |
|   | 6 | 1900 | NA | 4850 | 2.55 | F |
| 2 | 0.75 | 2030 | NA | 5400 | 2.66 | P |
|   | 6 | 2456 | NA | 6300 | 2.57 | P |
| 3 | 2 | 3804 | 1024 | 8902 | 2.34 | P |
|   | 5 | 4877 | NA | 10034 | 2.06 | P |
|   | 11 | 5082 | 1003 | 10878 | 2.14 | P |
| 4 | 1 | 2654 | NA | 7379 | 2.78 | P |
|   | 3 | 2815 | NA | 9400 | 3.34 | P |
| 5 | 0.83 | 6700 | NA | 23000 | 3.43 | P |
|   | 5 | 10299 | NA | 38000 | 3.69 | P |
| 6 | 1 | 3758 | NA | 12500 | 3.33 | P |
|   | 3 | 3970 | NA | 14500 | 3.65 | P |
| Spec.[4] |  | 2000+ | 2000− | 5000+ | 4− |  |

[1]After Rolling Thin-Film Oven Test (RTFOT) aging.
[2]Ratio of viscosity after RTFOT to viscosity before RTFOT.
[3]Indicates if sample passes (P) or fails (F) PBA 6 viscosity specification requirements.
[4]Viscosity requirements for PBA 6 asphalt specification.

TABLE III

Viscosity Data for Comparative Examples A–E

| Example No. | Storage Time (Days) | Vis. at 60° C. (Poise) | Vis. at 135° C. (cSt) | Vis. at 60° C. (Poise)[1] | Vis. Ratio[2] | P/F[3] |
|---|---|---|---|---|---|---|
| A | 1 | 28014 | 2128 | NA | NA | F |
|   | 2 | 100000 | 2233 | 8917 | 0.09 | F |
|   | 6 | 26580 | 1463 | 4080 | 0.15 | F |
|   | 11 | 11618 | 1036 | 4000 | 0.34 | F |
| B | 1 | 49842 | 2866 | NA | NA | F |
|   | 2 | 100000 | 2954 | 16647 | 0.17 | F |
|   | 4 | 150000 | 3024 | 9336 | 0.06 | F |
|   | 7 | 29000 | 1517 | 5305 | 0.18 | P |
| C | 1 | 6631 | 1618 | 3513 | 0.53 | F |
|   | 3 | 2459 | 1041 | NA | NA | P |
| D | 1 | 49667 | 2106 | 22673 | 0.46 | F |
|   | 3 | 100000 | 2489 | 12650 | 0.13 | F |
| E | 0.75 | 2600 | NA | 9120 | 3.51 | P |
|   | 3 | 2438 | NA | 9247 | 3.79 | P |
|   | 4 | 2500 | NA | NA | NA | P |
|   | 5 | 1989 | NA | NA | NA | F |
|   | 10 | 1800 | NA | NA | NA | F |
| Spec.[4] |   | 2000+ | 2000− | 5000+ | 4− |   |

[1] After Rolling Thin-Film Oven Test (RTFOT) aging.
[2] Ratio of viscosity after RTFOT to viscosity before RTFOT.
[3] Indicates if sample passes (P) or fails (F) PBA 6 viscosity specification requirements.
[4] Viscosity requirements for PBA 6 asphalt specification.

The data in Table II demonstrates that the viscosity requirements of the PBA 6 asphalt specification can be readily meet by preparing a polymer-modified asphalt composition using a sufficient amount of both a glycidyl-containing ethylene copolymer and a styrene/conjugated-diene block copolymer (Examples 2–6).

In contrast, the data in Table III illustrates that the polymer-modified asphalt compositions prepared using only a styrene/conjugated-diene block copolymer (Comparative Examples A-D) or only a glycidyl-containing ethylene copolymer (Example E) did not typically have viscosity properties suitable for the PBA 6 specification.

What is claimed is:

1. A polymer-modified asphalt composition comprising:
   (a) about 80 to 99.7 weight percent of a polymer-asphalt reaction product prepared by reacting (i) about 100 parts by weight of an asphalt having an initial viscosity at 60° C. of from 100 to 20,000 poise, with (ii) about 0.5 to 11 parts by weight of a glycidyl-containing ethylene copolymer containing about 0.1 to about 20 weight percent glycidyl moieties and having a weight-average molecular weight of from about 10,000 to about 1,000,000; and
   (b) about 0.3 to 20 weight percent of a styrene/conjugated-diene block copolymer having a weight-average molecular weight of from about 100,000 to about 1,000,000.

2. The polymer-modified asphalt composition according to claim 1 wherein said asphalt has an initial viscosity at 60° C. of from 150 to 4,000 poise.

3. The polymer-modified asphalt composition according to claim 2 wherein said polymer-asphalt reaction product is prepared by reacting about 100 parts by weight of said asphalt with 0.75 to 5.25 parts by weight of said glycidyl-containing ethylene copolymer.

4. The polymer-modified asphalt composition according to claim 3 wherein said composition contains 0.4 to 10 weight percent of said styrene/conjugated-diene block copolymer.

5. The polymer-modified asphalt composition according to claim 4 wherein said asphalt has an initial viscosity at 60° C. of from 175 to 1,500 poise.

6. The polymer-modified asphalt composition according to claim 1 wherein said glycidyl-containing ethylene copolymer contains 0.2 to 10 weight percent glycidyl moieties.

7. The polymer-modified asphalt composition according to claim 1 wherein said glycidyl-containing ethylene copolymer is a random copolymer having the generalized formula:

$$E/X/Y$$

wherein E represents a copolymer unit having the formula:

$$-CH_2CH_2-$$

and E comprises about 35 to 99.5 weight percent of said glycidyl-containing ethylene copolymer;
X represents a copolymer unit having the formula:

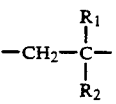

wherein $R_1$ is hydrogen, methyl or ethyl; and $R_2$ is $-C(O)OR_3$, $-OC(O)R_3$ or $-OR_3$, wherein $R_3$ is alkyl having 1 to about 10 carbon atoms; and X comprises 0 to about 50 weight percent of said glycidyl-containing ethylene copolymer; and
Y represents a copolymer unit having the formula:

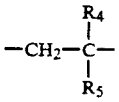

wherein $R_4$ is hydrogen or methyl; and $R_5$ is an epoxide-containing moiety having the formula:

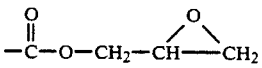

or

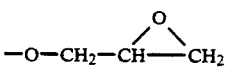

and Y comprises about 0.50 to about 15 weight percent of said glycidyl-containing ethylene copolymer.

8. The polymer-modified asphalt composition according to claim 7 wherein $R_1$ is hydrogen or methyl, and $R_2$ is $-C(O)OR_3$.

9. The polymer-modified asphalt composition according to claim 8 wherein $R_4$ is methyl, and $R_5$ is an epoxide-containing moiety having the formula:

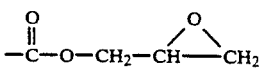

10. The polymer-modified asphalt composition according to claim 9 wherein said glycidyl-containing ethylene copolymer contains 10 to 40 weight percent X copolymer units, 0.75 to 10 weight percent Y copolymer units, the remainder being E copolymer units.

11. The polymer-modified asphalt composition according to claim 10 wherein $R_1$ is hydrogen and $R_3$ is alkyl having 1 to 4 carbon atoms.

12. The polymer-modified asphalt composition according to claim 9 wherein said glycidyl-containing ethylene copolymer contains 0.75 to 10 weight percent Y copolymer units, the remainder being E copolymer units.

13. The polymer-modified asphalt composition according to claim 1 wherein said styrene/conjugated-diene block copolymer contains about 10 to about 50 weight percent copolymer units derived from styrene and about 50 to about 90 weight percent copolymer units derived from a conjugated-diene.

14. The polymer-modified asphalt composition according to claim 13 wherein said conjugated-diene is butadiene or isoprene.

15. The polymer-modified asphalt composition according to claim 14 wherein said conjugated-diene is butadiene.

16. The polymer-modified asphalt composition according to claim 14 wherein said styrene/conjugated-diene block copolymer is a linear or radial block copolymer.

17. An aggregate composition comprising aggregate and from about 3 to about 15 weight percent of a polymer-modified asphalt composition comprising:
(a) about 80 to 99.7 weight percent of a polymer-asphalt reaction product prepared by reacting (i) about 100 parts by weight of an asphalt having an initial viscosity at 60° C. of from 100 to 20,000 poise, with (ii) about 0.5 to 11 parts by weight of a glycidyl-containing ethylene copolymer containing about 0.1 to about 20 weight percent glycidyl moieties and having a weight-average molecular weight of from about 10,000 to about 1,000,000; and
(b) about 0.3 to 20 weight percent of a styrene/conjugated-diene block copolymer having a weight-average molecular weight of from about 100,000 to about 1,000,000.

18. The aggregate composition according to claim 17 wherein said asphalt has an initial viscosity at 60° C. of from 150 to 4,000 poise.

19. The aggregate composition according to claim 17 wherein said glycidyl-containing ethylene copolymer is a random copolymer having the generalized formula:

E/X/Y wherein E represents a copolymer unit having the formula:

—CH$_2$CH$_2$— and E comprises about 35 to 99.5 weight percent of said glycidyl-containing ethylene copolymer;
X represents a copolymer unit having the formula:

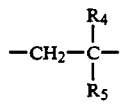

wherein $R_1$ is hydrogen, methyl or ethyl; and $R_2$ is —C(O)OR$_3$, —OC(O)R$_3$ or —OR$_3$, wherein $R_3$ is alkyl having 1 to about 10 carbon atoms; and X comprises 0 to about 50 weight percent of said glycidyl-containing ethylene copolymer; and
Y represents a copolymer unit having the formula:

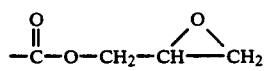

wherein $R_4$ is hydrogen or methyl; and $R_5$ is an epoxide-containing moiety having the formula:

or

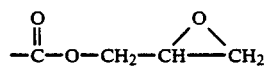

and Y comprises about 0.50 to about 15 weight percent of said glycidyl-containing ethylene copolymer.

20. The aggregate composition according to claim 19 wherein $R_1$ is hydrogen; $R_2$ is —C(O)OR$_3$, wherein $R_3$ is alkyl having 1 to 4 carbon atoms; $R_4$ is methyl; and $R_5$ is an epoxide-containing moiety having the formula:

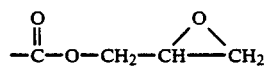

21. The aggregate composition according to claim 19 wherein said glycidyl-containing ethylene copolymer contains 10 to 40 weight percent X copolymer units, 0.75 to 10 weight percent Y copolymer units, the remainder being E copolymer units.

22. The aggregate composition according to claim 19 wherein said glycidyl-containing ethylene copolymer contains 0.75 to 10 weight percent Y copolymer units, the remainder being E copolymer units.

23. The aggregate composition according to claim 17 wherein said styrene/conjugated-diene block copolymer contains about 10 to about 50 weight percent copolymer units derived from styrene and about 50 to about 90 weight percent copolymer units derived from a conjugated-diene.

24. The aggregate composition according to claim 23 wherein said conjugated-diene is butadiene or isoprene.

25. The aggregate composition according to claim 24 wherein said conjugated-diene is butadiene.

26. The aggregate composition according to claim 25 wherein said styrene/conjugated-diene block copolymer is a linear or radial block copolymer.

27. A process for preparing a polymer-modified asphalt composition, said process comprising:
(a) forming a reaction mixture comprising:
(i) 70 to 99.2 weight percent of an asphalt having an initial viscosity at 60° C. of from about 100 to about 20,000 poise,
(ii) about 0.5 to 10 weight percent of a glycidyl-containing ethylene copolymer containing about 0.1 to about 20 weight percent glycidyl moieties and having a weight-average molecular weight of from about 10,000 to about 1,000,000, and
(iii) about 0.3 to 20 weight percent of a styrene/conjugated-diene block copolymer having a weight-average molecular weight of from about 100,000 to about 1,000,000; and (b) mixing said reaction mixture for a time and at a temperature sufficient to cause substantially complete reaction of said asphalt with the glycidyl moieties of said glycidyl-containing ethylene copolymer.

28. The process according to claim 27 wherein said mixing is conducted at a temperature in the range from about 170° C. to about 220° C. for about 6 to 36 hours.

29. The process according to claim 28 wherein said mixing is conducted at a temperature in the range from about 190° C. to about 200° C. for about 8 to 24 hours.

30. The process according to claim 27 wherein said asphalt has an initial viscosity at 60° C. of from 150 to 4,000 poise.

31. The process according to claim 27 wherein said glycidyl-containing ethylene copolymer is a random copolymer having the generalized formula:

E/X/Y wherein E represents a copolymer unit having the formula:

and E comprises about 35 to 99.5 weight percent of said glycidyl-containing ethylene copolymer;

X represents a copolymer unit having the formula:

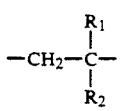

wherein $R_1$ is hydrogen, methyl or ethyl; and $R_2$ is —C(O)OR$_3$, —OC(O)R$_3$ or —OR$_3$ wherein $R_3$ is alkyl having 1 to about 10 carbon atoms; and X comprises 0 to about 50 weight percent of said glycidyl-containing ethylene copolymer; and Y represents a copolymer unit having the formula:

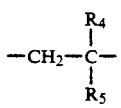

wherein $R_4$ is hydrogen or methyl; and $R_5$ is an epoxide-containing moiety having the formula:

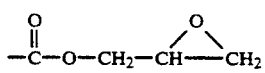

or

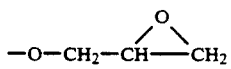

and Y comprises about 0.50 to about 15 weight percent of said glycidyl-containing ethylene copolymer.

32. The process according to claim 31 wherein $R_1$ is hydrogen; $R_2$ is —C(O)OR$_3$, wherein $R_3$ is alkyl having 1 to 4 carbon atoms; $R_4$ is methyl; and $R_5$ is an epoxide-containing moiety having the formula:

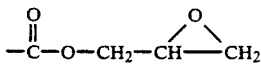

33. The process according to claim 31 wherein said glycidyl-containing ethylene copolymer contains 10 to 40 weight percent X copolymer units, 0.75 to 10 weight percent Y copolymer units, the remainder being E copolymer units.

34. The process according to claim 31 wherein said glycidyl-containing ethylene copolymer contains 0.75 to 10 weight percent Y copolymer units, the remainder being E copolymer units.

35. The process according to claim 27 wherein said styrene/conjugated-diene block copolymer contains about 10 to about 50 weight percent copolymer units derived from styrene and about 50 to about 90 weight percent copolymer units derived from a conjugated-diene.

36. The process according to claim 35 wherein said conjugated-diene is butadiene or isoprene.

37. The process according to claim 36 wherein said conjugated-diene is butadiene.

38. The process according to claim 35 wherein said styrene/conjugated-diene block copolymer is a linear or radial block copolymer.

39. A polymer-modified asphalt composition obtainable by the process of claim 27.

40. A process for preparing a polymer-modified asphalt composition, said process comprising:
(a) forming a reaction mixture comprising:
(i) about 90 to 99.5 weight percent of an asphalt having an initial viscosity at 60° C. of from about 100 to about 20,000 poise, and
(ii) about 0.5 to 10 weight percent of a glycidyl-containing ethylene copolymer containing about 0.1 to about 20 weight percent glycidyl moieties and having a weight-average molecular weight of from about 10,000 to about 1,000,000;
(b) mixing said reaction mixture for a time and at a temperature sufficient to cause substantially complete reaction of said asphalt with the glycidyl moieties of said glycidyl-containing ethylene copolymer; and
(c) blending about 0.3 to 25 parts by weight of a styrene/conjugated-diene copolymer block having a weight-average molecular weight of from about 100,000 to about 1,000,000, with about 100 parts by weight of the reaction product from step (b) above.

41. The process according to claim 40 wherein said mixing is conducted at a temperature in the range from about 170° C. to about 220° C. for about 6 to 36 hours.

42. The process according to claim 41 wherein said mixing is conducted at a temperature in the range from about 190° C. to about 200° C. for about 8 to 24 hours.

43. The process according to claim 42 wherein said blending is conducted at a temperature in the range from about 170° C. to about 220° C. for about 2 to 24 hours.

44. The process according to claim 40 wherein said asphalt has an initial viscosity at 60° C. of from 150 to 4,000 poise.

45. The process according to claim 40 wherein said glycidyl-containing ethylene copolymer is a random copolymer having the generalized formula:

E/X/Y wherein E represents a copolymer unit having the formula:

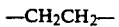

and E comprises about 35 to 99.5 weight percent of said glycidyl-containing ethylene copolymer;

X represents a copolymer unit having the formula:

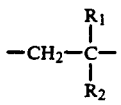

wherein $R_1$ is hydrogen, methyl or ethyl; and $R_2$ is —C(O)OR$_3$, —OC(O)R$_3$ or —OR$_3$, wherein $R_3$ is alkyl having 1 to about 10 carbon atoms; and X comprises 0 to about 50 weight percent of said glycidyl-containing ethylene copolymer; and Y represents a copolymer unit having the formula:

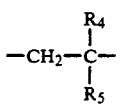

wherein $R_4$ is hydrogen or methyl; and $R_5$ is an epoxide-containing moiety having the formula:

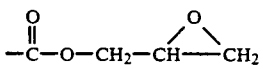

or

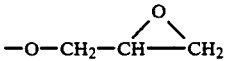

and Y comprises about 0.50 to about 15 weight percent of said glycidyl-containing ethylene copolymer.

46. The process according to claim 45 wherein $R_1$ is hydrogen; $R_2$ is —C(O)OR$_3$, wherein $R_3$ is alkyl having 1 to 4 carbon atoms; $R_4$ is methyl; and $R_5$ is an epoxide-containing moiety having the formula:

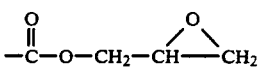

47. The process according to claim 45 wherein said glycidyl-containing ethylene copolymer contains 10 to 40 weight percent X copolymer units, 0.75 to 10 weight percent Y copolymer units, the remainder being E copolymer units.

48. The process according to claim 45 wherein said glycidyl-containing ethylene copolymer contains 0.75 to 10 weight percent Y copolymer units, the remainder being E copolymer units.

49. The process according to claim 40 wherein said styrene/conjugated-diene block copolymer contains about 10 to about 50 weight percent copolymer units derived from styrene and about 50 to about 90 weight percent copolymer units derived from a conjugated-diene.

50. The process according to claim 49 wherein said conjugated-diene is butadiene or isoprene.

51. The process according to claim 50 wherein said conjugated-diene is butadiene.

52. The process according to claim 51 wherein said styrene/conjugated-diene block copolymer is a linear or radial block copolymer.

53. A polymer-modified asphalt composition obtainable by the process of claim 40.

* * * * *